US006346707B1

(12) United States Patent
Vizard et al.

(10) Patent No.: US 6,346,707 B1
(45) Date of Patent: Feb. 12, 2002

(54) ELECTRONIC IMAGING SYSTEM FOR AUTORADIOGRAPHY

(75) Inventors: Douglas L. Vizard, Durham; Joel N. Helfer, Chesire; William E. McLaughlin, East Haven, all of CT (US); David J. Steklenski, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/123,283

(22) Filed: Jul. 28, 1998

Related U.S. Application Data

(63) Continuation-in-part of application No. 08/652,401, filed on May 23, 1996, now Pat. No. 5,830,629.

(51) Int. Cl.$^7$ ................................................ G01T 1/20
(52) U.S. Cl. ................................. 250/368; 250/370.11
(58) Field of Search .......................... 250/368, 369, 250/370.11, 370.08, 483.1, 482.1, 484.4; 378/98.3; 430/496, 523

(56) References Cited

U.S. PATENT DOCUMENTS

| | | | | |
|---|---|---|---|---|
| 2,502,529 A | * | 4/1950 | Murray ........................... 95/8 |
| 2,887,379 A | * | 5/1959 | Blake et al. .................... 96/82 |
| 3,300,310 A | * | 1/1967 | Kennard et al. ................ 96/82 |
| 3,418,246 A | * | 12/1968 | Royce ........................ 252/301.4 |
| 3,607,770 A | * | 9/1971 | Rabatin .................... 252/301.4 |
| 3,617,743 A | * | 11/1971 | Rabatin ........................ 250/71 |
| 3,725,704 A | * | 4/1973 | Buchanan et al. ............. 250/71 |
| 3,974,389 A | * | 8/1976 | Ferri et al. ................... 250/483 |
| 4,015,126 A | * | 3/1977 | Herrington ................... 250/320 |
| 4,225,653 A | * | 9/1980 | Brixner ........................ 428/539 |
| 4,311,907 A | * | 1/1982 | Takami et al. ............... 250/368 |
| 4,315,183 A | * | 2/1982 | Merritt ........................ 313/94 |
| 4,415,810 A | * | 11/1983 | Brown, Sr. ............... 250/484.1 |
| 4,532,425 A | * | 7/1985 | Abileah et al. ........ 250/363.02 |
| 4,845,369 A | * | 7/1989 | Arakawa et al. ......... 250/484.1 |
| 5,127,038 A | * | 6/1992 | Jeromin et al. ................ 378/28 |
| 5,830,629 A | * | 11/1998 | Vizard et al. ................ 430/523 |
| 6,031,892 A | * | 2/2000 | Karellas .................... 378/98.3 |

* cited by examiner

Primary Examiner—Constantine Hannaher
(74) Attorney, Agent, or Firm—William F. Noval

(57) ABSTRACT

An imaging system with an imaging assemblage including a prompt phosphor layer for converting an ionizing radiation image into a light image, and a transparent layer supporting the phosphor layer; wherein the light image is transmitted through the transparent layer; an electronic camera for converting the light image into an electronic image; and a light image transmission system between the imaging assemblage and the electronic camera for transmitting the light image to the electronic camera.

6 Claims, 2 Drawing Sheets

ELECTRONIC IMAGING SYSTEM FOR AUTORADIOGRAPHY

CROSS REFERENCE TO RELATED APPLICATIONS

This application claims the benefit under 35 USC §120 of the earlier filing date of U.S. patent application Ser. No. 08/652,401 (U.S. Pat. No. 5,830,629), filed May 23, 1996, inventors Douglas L. Vizard et al and is a CIP thereof.

FIELD OF THE INVENTION

This invention relates in general to electronic imaging systems and more particularly to the electronic image capture of autoradiographic images.

BACKGROUND OF THE INVENTION

There exists a need for a simple, cost effective and efficient system for electronically capturing images produced by ionizing radiation techniques such as radiography and autoradiography. Conventional film or screen autoradiography necessitates chemical development of the film before the image can be seen. This process is complex and time consuming. Computed autoradiography techniques produce a latent radiation image in a storage phosphor which is subsequently converted to an electronic image by a storage phosphor reader. This system is expensive, time consuming and complex. Moreover, neither system provides a representation of the radiation image which can be accessed immediately.

SUMMARY OF THE INVENTION

According to the present invention, there is provided a solution to the problems of the prior art.

According to a feature of the present invention, there is provided an imaging system comprising: an imaging assemblage including a prompt phosphor layer for converting an ionizing radiation image into a light image, and a transparent layer supporting the phosphor layer; wherein the light image is transmitted through the transparent layer; an electronic camera for converting the light image into an electronic image; and a light image transmission system between the imaging assemblage and the electronic camera for transmitting the light image to the electronic camera.

ADVANTAGEOUS EFFECT OF THE INVENTION

The invention has the following advantages.

1. An electronic imaging system is provided for autoradiographic applications which is simple, cost effective and efficient.

2. A representation of the radiation image can be accessed immediately.

DETAILED DESCRIPTION OF THE INVENTION

Figure 1:
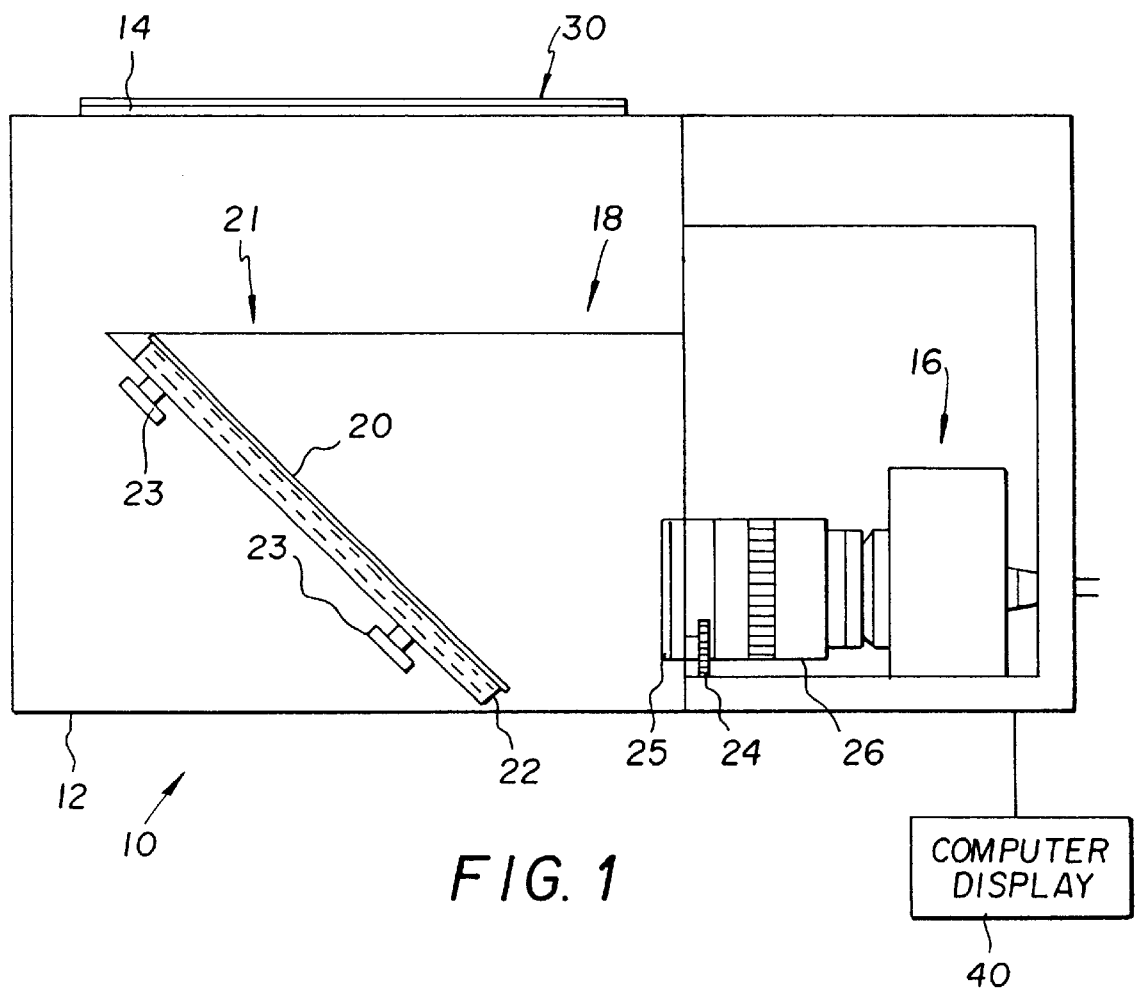
FIG. 1 is a diagrammatic elevational view of an embodiment of the invention.

Referring now to FIG. 1, there is shown an electronic imaging system according to the present invention. As shown, electronic imaging system 10 includes a housing 12, an imaging assemblage 14, an electronic camera 16 and a light image transmission system 18, includes mirror 20 in mirror housing 21. Mirror 20 is supported on foam pad 22, adjustments 23 are provided for adjusting mirror 20. Housing 21 includes retainer 24. System 18 includes diopter 25 and zoom lens 26. Connector 27 and cable 28 connect camera 16 to a computer/display 29 where a captured image can be displayed.

Ionizing radiation source 30 produces an ionizing radiation image which is converted by imaging assemblage 14 into a light image. GNA preferred application source 30 is an autoradiographic source in contact with assemblage 14. Source 30 can be located distant from assemblage 14 and be a source of x-radiation, electron radiation, or UV (ultraviolet) radiation. In such case, the radiation image is projected to assemblage 14.

Figure 2:
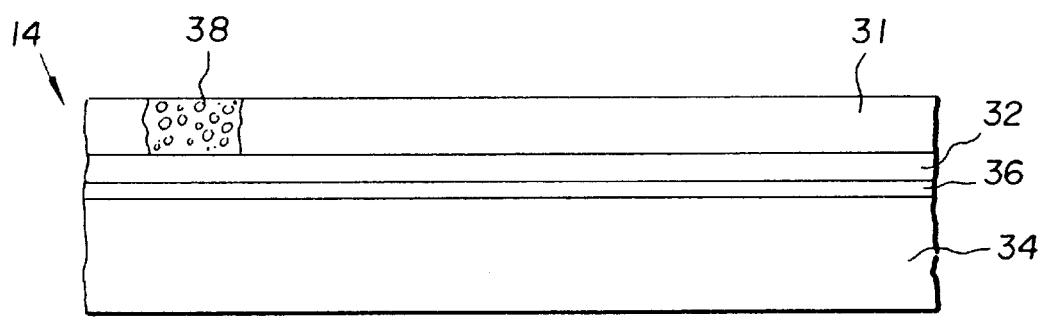
FIG. 2 is an elevational view of the imaging assemblage of FIG. 1.

As shown in FIG. 2, imaging assemblage 14 includes a phosphor layer 31, transparent support layer 32, a transparent platen 34, and a boundary layer 36 (air) between platen 34 and support layer 32. Phosphor layer 31 contains a prompt phosphor 38 capable of absorbing an ionizing radiation image to produce a corresponding light image.

The phosphor layer can take any convenient form and although the gadolinium oxysulfide phosphor is preferred, any phosphor that produces satisfactory levels of light emission can be used in this invention with or without films that are spectrally sensitized. Examples of phosphors useful in this invention are those disclosed in Research Disclosure, Vol. 184, August 1979, Item 18431, Section IX.

Examples of useful phosphors are those having a fluorescent layer comprised of a phosphor chosen from rare earth oxychalcogenide and halide phosphors of the formula:

$$M_{(w-n)}M'_nO_wX$$

wherein:

M is at least one of yttrium, lanthanum, gadolinium, or lutetium;

M' is at least one of dysprosium, erbium, europium, holmium, neodymium, praseodymium, samarium, terbium, thulium, or ytterbium;

X is a middle chalcogen (S, Se, or Te) or halogen;

n is 0.0002 to 0.2; and w is 1 when X is halogen or 2 when X is chalcogen.

Other specifically preferred phosphors include calcium tungstate, niobium-activated or thulium-activated yttrium tantalate, and terbium-activated gadolinium or lutetium oxysulfide.

Calcium tungstate phosphors are illustrated by Wynd et al in U.S. Pat. No. 2,303,942. Niobium-activated and rare earth activated yttrium, lutetium and gadolinium tantalates are disclosed by Brixner in U.S. Pat. No. 4,225,653. Rare earth activated gadolinium and yttrium middle chalcogen phosphors are taught by Royce in U.S. Pat. No. 3,418,246. Rare earth activated lanthanum and lutetium middle chalcogen phosphors are illustrated by Yocom in U.S. Pat. No. 3,418,247. Terbium-activated lanthanium, gadolinium and lutetium oxysulfide phosphors are disclosed by Buchanan et al in U.S. Pat. No. 3,725,704 and Nath in U.S. Pat. No. 3,878,119. Cerium activated lanthanum oxychloride phosphors are taught by Swindells in U.S. Pat. No. 2,729,604. Terbium activated and optionally cerium activated lanthanum and gadolinium oxyhalide phosphors are disclosed by Rabatin in U.S. Pat. No. 3,617,743, and Ferri et al in U.S. Pat. No. 3,974,389. Rare earth activated rare earth oxyhalide phosphors are disclosed by Rabatin in U.S. Pat. Nos. 3,591, 516 and 3,607,770. Terbium activated and ytterbium activated rare earth oxyhalide phosphors are disclosed by Rabatin in U.S. Pat. No. 3,666,676. Thulium activated lanthanum oxychloride or oxybromide phosphors are illustrated by Rabatin in U.S. Pat. No. 3,795,814. A $(Y,Gd)_2O_2S$:Tb phosphor wherein the ratio of yttrium to gadolinium is between 93:7 and 97:3 is illustrated by Yale in U.S. Pat. No. 4,405,691. Non-rare earth co-activators can be employed as illustrated by bismuth and ytterbium activated lanthanum oxychloride phosphors disclosed by Luckey et al in U.S. Pat. No. 4,311,487. The mixing of phosphors as well as the coating of phosphors in separate layers of the same screen are specifically recognized. A phosphor mixture of calcium tungstate and yttrium tantalate is disclosed by Patten in U.S. Pat. No. 4,387,141. Activated lanthanum oxyhalide e.g. thulium, etc. phosphors are made by methods described in Brine et al., U.S. Pat. No. 4,499,159. A phosphor mixture of yttrium tantalate and lanthanum oxyhalide phosphors is described in Zegarski, U.S. Pat. No. 5,069,982. An additional phosphor reference includes DeBoer et al., U.S. Pat. No. 4,733,090.

While it is recognized that the phosphor layers need not contain separate binders, in most applications the phosphor layers contain sufficient binder to provide structural coherence to the phosphor layer. In general, the binders useful in the practice of the invention are those conventionally employed in the art. Binders are generally chosen from a wide variety of known polymers which are transparent to x-radiation and emitted light. Binders commonly employed in the art include sodium o-sulfobenzaldehyde acetal of poly(vinyl alcohol), chlorosulfonated polyethylene, a mixture of macromolecular bisphenol polycarbonates and copolymers comprising bisphenol carbonates and poly (alkylene oxides); aqueous ethanol soluble nylons; poly (alkyl acrylates and methacrylates) and copolymers of poly (alkyl acrylates and methacrylates) with acrylic and methacrylic acids; poly(vinyl butyral), and polyurethane elastomers. These and other useful binders are disclosed in U.S. Pat. Nos. 2,502,529; 2,887,379; 3,617,285; 3,300,310; 3,300,311; and 3,743,833; and in Research Disclosure, Vol. 154, February 1977, Item 15444; and Vol. 182, June 1979. Research Disclosure, incorporated herein by reference. Particularly preferred binders are polyurethanes, such as those commercially available under the trademark "Estane" from Goodrich Chemical Co., and under the trademark "Peimuthane" from A.H. Stahl.

The transparent layer 32 used can be clear poly(ethyleneterephthalate) ranging from about 0.001–0.007 inches thick. The support need only be thick enough to provide adequate support for the phosphor layer. Where thick phosphor layers are needed, supports on the thicker end of the described range are used. Where less phosphor is needed, supports on the thinner end of the range can be used. Other conventional transparent support materials can also be used such as acetate base or poly(methyl methacrylate). Should a protective overcoat on the phosphor be desired, a range of 0–3 micrometers of transparent polymer may be applied.

Figure 3:
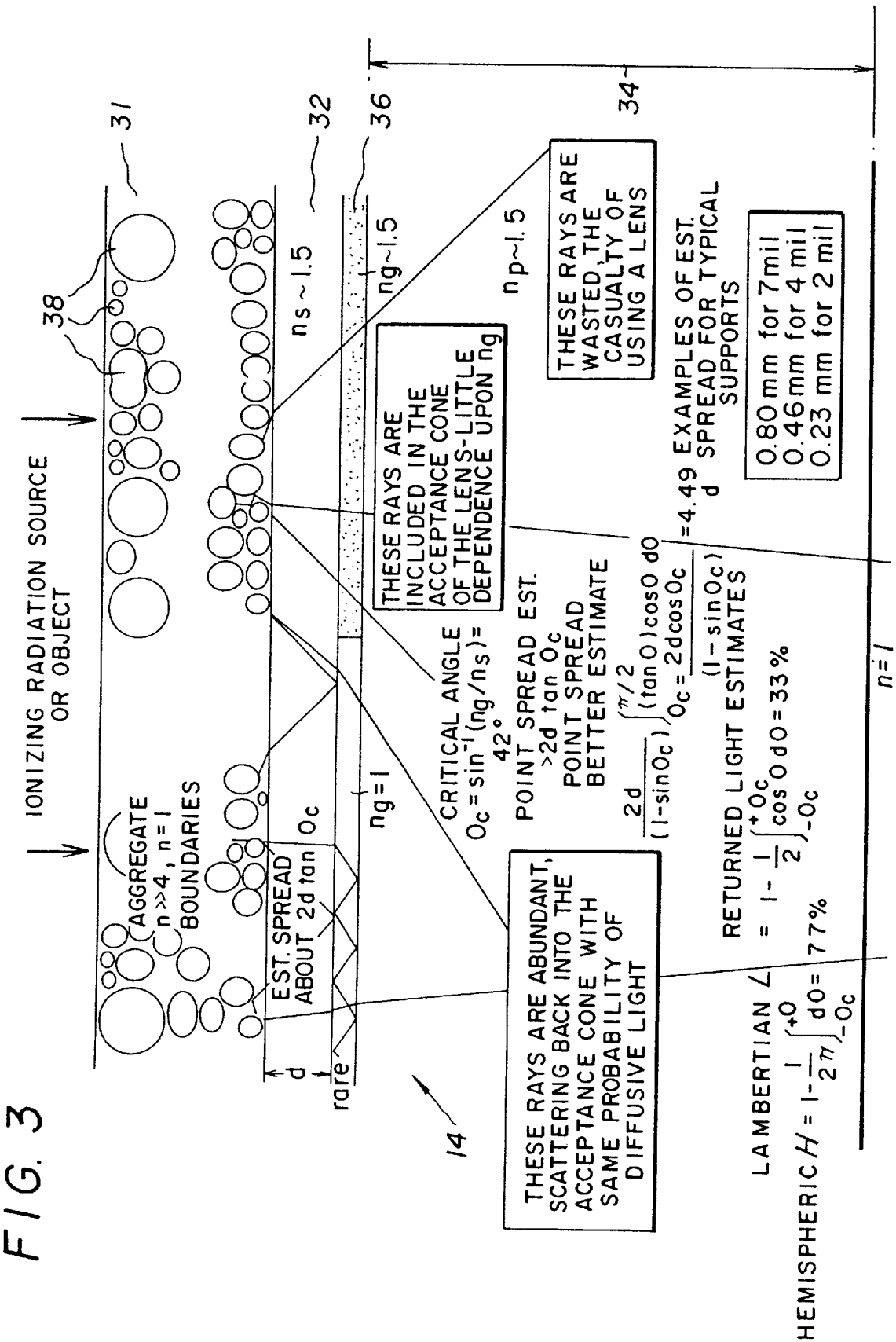
FIG. 3 is a diagrammatic view useful in explaining the present invention.

Following is an explanation of imaging assemblage 14 with reference to FIG. 3 which shows an expanded view of imaging assemblage 14.

A phosphor, optimized to promptly transform ionizing radiation into light that may be optically managed for imaging, is an aggregate composition that scatters light profusely and diffusively. To be appropriately used in an imaging system, the phosphor must be constructed as a uniform laminant on a mechanically rigid surface appropriate to secondary object formation, preferably in a uniform plane or curved surface. The preferred surface is a clear support, transmitting the light to be imaged, so that the phosphor side of the support may be unobstructed for the purpose of presenting or projecting radiation to the phosphor.

In practice, the phosphor may be uniformly coated onto a thin clear support to accommodate coating manufacture, and subsequently attached to a thicker clear support platen for mechanical rigidity. Alternatively, the phosphor may be coated onto a clear thick platen that may provide mechanical rigidity, but such an alternative is less practical in manufacture and yields less manageable light for imaging as is discussed below.

A small fraction of the scattered light may be optically managed for the purpose of imaging. The thin phosphor support thickness and the refractive indices of the support and the support/platen boundary determine the amount of light transmitted by the boundary that is directed through the platen at a sufficiently small angle to be constructively focused by an optical element, such as a lens, onto an imaging plane for detection by a sensor. The thickness domain of phosphor support is: thick enough to support practical manufacture (in practice a minimum of about 0.001 inches), and thin enough to accommodate appropriately high spatial resolution in the image of the secondary object.

The estimated contribution to manageable light from an appropriately constructed boundary layer nearly doubles the amount of light that may be imaged from a simple phosphor laminant on a thick platen. The thickness of the phosphor and its support acts to diminish the spatial resolution of the image. The diminution of resolution contributed by the support and boundary is in proportion to the spread of the light emanating from a point object in the phosphor plane, which is an estimated spread of $2d(\cos \emptyset_c)/(1-\sin \emptyset_c)$, where "d" is the phosphor support thickness and "$\emptyset_c$" is the critical angle of reflection at the boundary of the thin phosphor support and the platen. The critical angle $\emptyset_c = \sin^{-1}(n_g/n_s)$, where "$n_s$" is the refractive index of the phosphor support, and "$n_g$" is the refractive index of the boundary gap. It is advantageous to both imaging sensitivity and resolution that both "d" and "$n_g/n_s$" are minimized.

Since the practice of manufacture restricts the thickness "d" to practical materials (such as clear, smooth and flexible polyester of 1 mil or greater), assuring a small "$n_g/n_s$" contributes substantially to the imaging process. A small "$n_g/n_s$" is assured by constructing an optically discontinuous gap at the boundary. Since practical materials, such as polyester, have refractive indices of only about 1.5, a gap composition absent material (or simply comprising air) having a refractive index of 1.0 will maximize the amount of light reflected from the boundary at the smallest possible critical angle. Such a construction serves to achieve both the maximum amount of manageable light and the maximum spatial resolution for imaging.

The practical boundary conforming to the above description is simply formed by the adherence of the phosphor backing comprising thin polyester to an acrylic platen. Both or either must have appropriate surface treatments to prevent intimate attachment, which results in uncontrolled optical coupling and interference artifacts at the boundary. A practical, preferred and demonstrated coating is the "hardcoating" substance used on optical acrylic surfaces to prevent scratching. In addition, an anti-static coating on the opposing surface of the transparent support is beneficial, while either coatings are desirable to assure be absence of optical artifacts at the boundary.

The invention has been described in detail with particular reference to certain preferred embodiments thereof, but it will be understood that variations and modifications can be effected within the spirit and scope of the invention.

PARTS LIST

10 electronic imaging system
12 housing
14 imaging assemblage
16 electronic camera
18 light image transmission system
20 mirror
22 zoom lens
24 computer
26 ionizing radiation source
30 platen
32 phosphor layer
34 transparent support layer
36 layer of air

What is claimed is:

1. An imaging system comprising;

an imaging assemblage including a prompt phosphor layer for converting an ionizing radiation image into a light image;

a solid transparent support layer for supporting said phosphor layer, a solid transparent platen characterized by sufficient mechanical rigidity to define an object plane, and a boundary layer between said transparent support layer and said transparent platen for substantially increasing the amount of light imaged from said phosphor layer to said platen layer, wherein said boundary layer having a refractive index discontinuity for minimizing the critical angle of reflection at the boundary between said support layer and said transparent platen, wherein the ratio of the index of refraction of said boundary layer to the index of refraction of said phosphor layer is minimized to maximize light transmission and image spatial resolution;

an electronic camera for converting said light image into an electronic image; and a light image transmission system between said imaging assemblage and said electronic camera for transmitting said light image to said electronic camera.

2. The system of claim 1 wherein said phosphor layer of said imaging assemblage is gadolinium oxysulfide.

3. The system of claim 1 wherein said light image transmission system includes a reflecting mirror and a lens.

4. The system of claim 3 wherein said lens is a zoom lens.

5. The system of claim 1 wherein said electronic camera converts said light image into a digital image.

6. The system of claim 1 including an electronic display for displaying said electronic image.

\* \* \* \* \*